W. F. BROWN.
SHIRT BOSOM AND COLLAR PROTECTOR.
No. 191,924. Patented June 12, 1877.
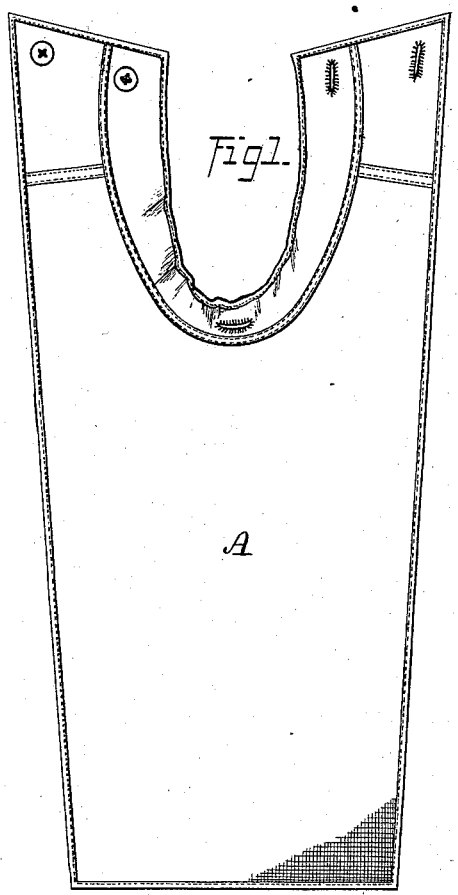
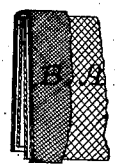
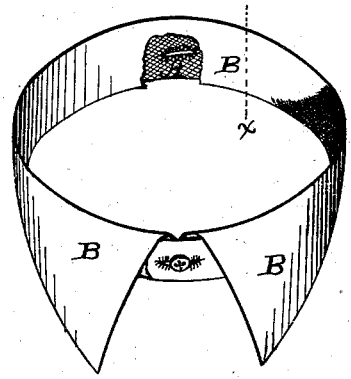
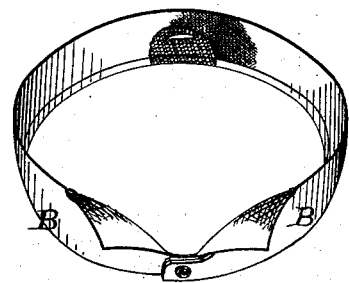

UNITED STATES PATENT OFFICE.

WILLIAM F. BROWN, OF NEWARK, OHIO.

IMPROVEMENT IN SHIRT BOSOM AND COLLAR PROTECTORS.

Specification forming part of Letters Patent No. 191,924, dated June 12, 1877; application filed April 11, 1877.

*To all whom it may concern:*

Be it known that I, WILLIAM F. BROWN, of Newark, in the county of Licking and State of Ohio, have invented certain new and useful Improvements in Combined Dickey and Shirt Bosom and Collar Protector; and I do hereby declare that the following is a full, clear, and exact description thereof, which will enable others skilled in the art to which it appertains to make and use the same, reference being had to the accompanying drawings and to the letters of reference marked thereon, which form a part of this specification, and in which—

Figure 1 is a view, in elevation, of my improved dickey and shirt bosom and collar protector. Figs. 2 and 3 are views, in perspective, showing the application of my protector to the collar. Fig. 4 is a section through the dotted line x x of Fig. 2; and Fig. 5 is a detached view of Fig. 3.

Corresponding parts in the several figures are denoted by like letters.

This invention consists in providing a combined dickey and protector for shirt bosoms and collars from a material having a linen or textile body, re-enforced with a rubber or other coating impervious to moisture or perspiration, substantially as hereinafter more fully set forth.

In the annexed drawing, A refers to a bosom or protector, made in the usual form, and adapted for attachment to the shirt. This bosom or protector is made from a material having a linen or textile body, re-enforced on one side with rubber or other coating impervious to moisture or perspiration.

It will be seen that, by making the body of the material of linen, the bosom can be used as a dickey, and by coating the same on one side, as described, it protects the shirt-bosom from perspiration, and also acts a lung-protector.

It is obvious that by protecting the collar, as shown in Fig. 2, with this material, it—the collar—will also be protected from perspiration, &c.

B is a protector of the same material for standing-collars. This protector is cut diagonally, as shown at b, Fig. 5, to permit of the ends of the collar standing above said protector, and being turned outwardly, according to the usual custom, as seen in the said figure.

Having thus described my invention, what I claim, and desire to secure by Letters Patent, is—

1. The protector for shirt bosoms and collars, consisting of a dickey, A, with collar B made from material having a linen or textile body, and re-enforced upon one side with rubber or other coating impervious to moisture, substantially as and for the purpose set forth.

2. The collar B, made of the material named, and in one piece, and cut diagonally, as shown at b, substantially as and for the purpose set forth.

In testimony that I claim the foregoing as my own I hereunto affix my signature in presence of two witnesses.

W. F. BROWN.

Witnesses:
JOHN MOORE,
W. B. HOUSTON.